Feb. 3, 1931.      R. E. MANLEY      1,791,073
DRILL SUPPORT
Filed Oct. 16, 1925      2 Sheets-Sheet 2
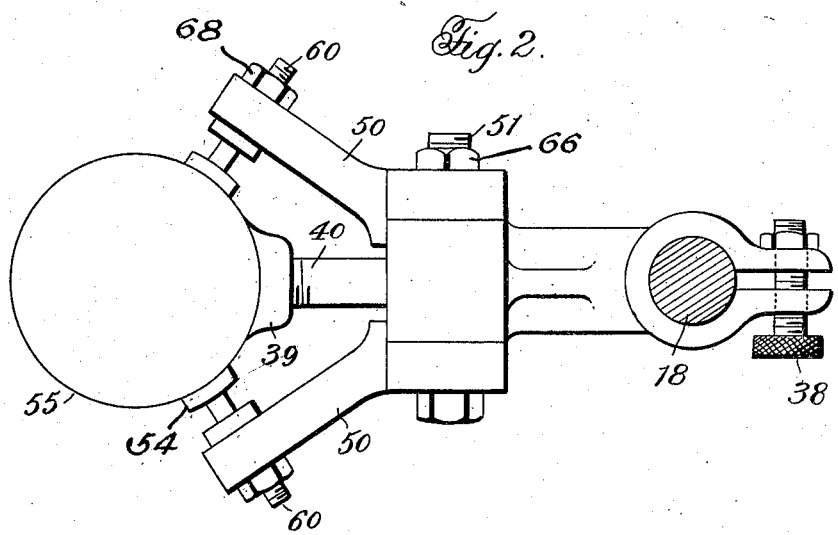
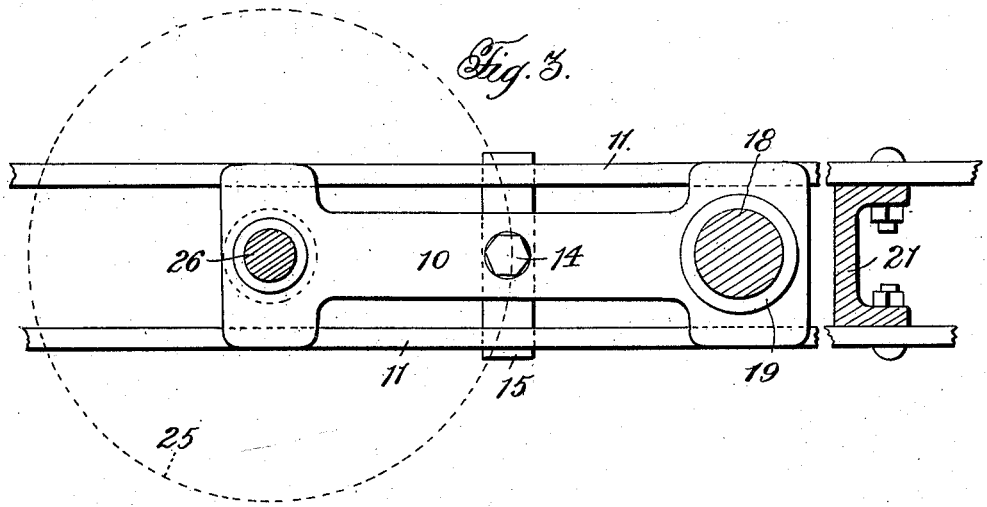

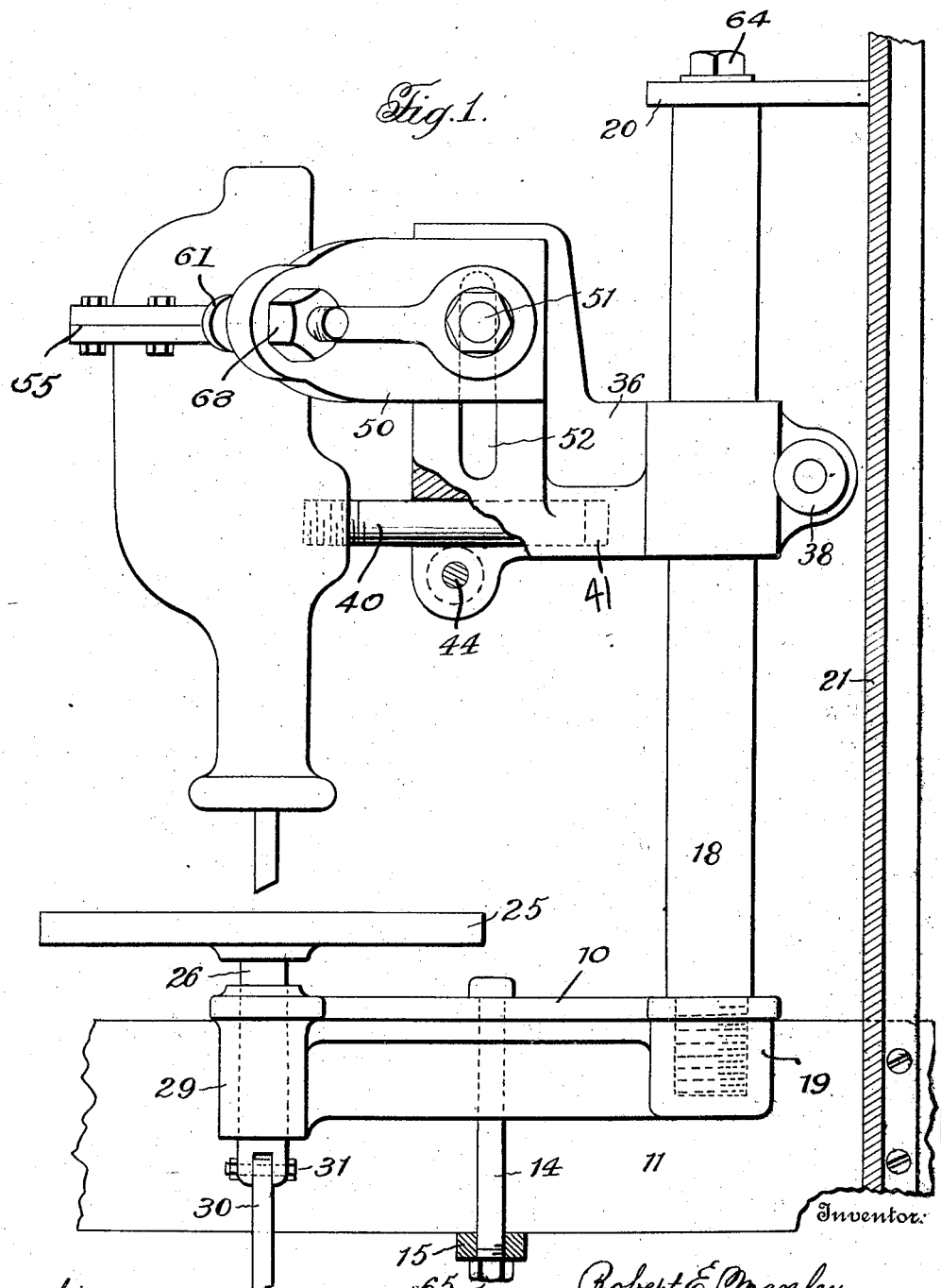

Patented Feb. 3, 1931

1,791,073

UNITED STATES PATENT OFFICE

ROBERT E. MANLEY, OF YORK, PENNSYLVANIA, ASSIGNOR TO MANLEY MANUFACTURING COMPANY, OF YORK, PENNSYLVANIA, A CORPORATION OF DELAWARE

DRILL SUPPORT

Application filed October 16, 1925. Serial No. 62,831.

This invention relates to supports for small drills and has for its principal object the provision of a universal support adapted to mount a drill on a press or other stand so as to be true with respect to the work table and yet be readily detachable.

In the drawings:—

Figure 1 is a side elevation.

Figure 2 is a top plan of the bracket.

Figure 3 is a top plan of the saddle.

The saddle 10 rests on the side pieces 11 of the press frame and is held in place thereon by means of a tie bolt 14 passing thru a strip 15 engaging the bottoms of the side bars 11. A post 18 is screwed into a socket in the boss 19 of the saddle and is braced at its top to the press frame upright 21 as by the small slotted flat piece 20 which merely abuts the press frame upright and naturally takes compression only as the brace only comes into play when the work table 25 is being raised against the drill, this feeding upward of the work table tending to move the top of the post 18 inward toward the press frame upright.

The work table 25 has an integral stem 26 sliding freely in a bore in the boss 29 of the saddle, the table receiving its motion from a foot lever (not shown) thru a link 30 pivoted as at 31 to the stem 26.

The bracket 36 is freely slidable on the post 18 but may be locked in position to give the drill the proper or desired height above the table by tightening the hand clamping screw 38. The usual handle of the drill in boss 39 is removed and for it is substituted a cylindrical stud 40 fitting in a split bore 41 of the bracket which bore may be contracted by a hand clamping screw 44 binding the stud in desired position both angularly and longitudinally. The stud is of size and shape to serve all purposes of the usual handle when the drill is removed.

The side members 50 are connected together by a bolt 51 passing thru a slot 52 in the bracket whereby the side pieces may be elevated or lowered so that their pads 54 engage the circular flange 55 of the half inch drill illustrated, which is almost standard equipment. In order, however, to make the device universal I tap or bore the pads and the ends of the side members and fit therein the bolts 60 having the concave heads 61 which can be adjusted to fit any of the drills on the market.

In order to install the device on a drill stand the base or saddle is placed in convenient position on the bed composed of the side pieces 11 and the nut 65 on the bottom of the tie bolt 14 is tightened. The heavy standard 18 is now braced by securing the flat piece 20 in position by the other stud bolt 64 and the bracket is slid upon it to the proper height with respect to the table 25.

The stud 40 is now positioned to bring the drill bit directly over the central hole in the table and to make it absolutely normal to the table as well. The wings or side pieces 50 are now adjusted to the level of the drill flange and the nut 66 on bolt 51 is tightened. The positioning screws 60 are now brought into firm contact with the drill flange and the lock nuts 68 bound, and need not again be adjusted for the same drill as the drill may be removed and used elsewhere by the mere unlocking of the hand clamping piece 44.

What I claim is:—

1. In a drill mounting for a small portable drill of the type having a laterally extending cylindrical handle at right angles to the axis of the drill, a vertically movable work table, a standard parallel to the line of movement of said table, a bracket adjustably mounted on said standard and having a bore to receive said handle to permit angular and axial movement, positioning means on said bracket to engage the near side of the body of said drill as the drill is moved into place so as to aline the drill axis with the work table axis and means for locking said handle in such alined position.

2. In a drill mounting, means for slidingly and pivotally supporting a drill about an axis at right angles to the axis of the drill and guiding means for engaging the drill to shift it angularly about said means as the drill is sliding in the direction of the first mentioned axis so as to bring the drill axis normal to its work support and means for locking said drill in such position.

3. In a support for a power drill having a lateral handle, a standard, a bracket adjustably mounted thereon and having a bore to receive said handle so that the drill may be moved laterally into position, a plurality of members adjustably mounted on said bracket for engaging the body of the drill as said drill is moved laterally into position, and means for locking the drill handle in adjusted position in said bore.

4. In a drill support, a body having a cylindrical bore therein to receive the cylindrical handle of a portable drill, a plurality of drill positioning side members adjustably mounted on said body in a plane not containing the axis of the bore, spaced from each other and from said bore, one of said members engaging the drill to swing the drill into engagement with both members so as to aline the drill with the prechosen axis of drilling, and means for locking the drill handle in said bore when the drill is in contact with said members.

5. In a drill mounting, a drill support having a bearing to receive a portion of a drill to guide the drill in a path at right angles to its axis, alining means lying in the path of said drill during such movement to engage the drill when its axis is alined with a prechosen axis of drilling, and a single means to lock said drill in such position.

6. The device of claim 5 in which the alining means consists of two spaced arms engaging the drill on opposite sides of its center line or axis.

7. The device of claim 5 in which the locking means is a clamping screw.

8. The device of claim 1 in which the drill body engaging means is adjustably movable radially of the location of the drill axis when the drill is in alined position.

9. The device of claim 1 in which the drill body engaging means is a pair of side arms adjustably mounted on the bracket and in which each side arm is provided with a stop member adjustably mounted in the arm in a direction radial of the axis of the table.

10. In combination, means to support a drill for sliding and angular movement as it is being moved to operative position, spaced means for engaging said drill to limit both sliding and angular movement of the drill body as the drill is being slidably moved into position, said spaced means being so positioned that either may engage the drill to swing the drill toward the other spaced means as the drill is moved into operative position both of said spaced means finally alining the drill, and a single clamp for holding the drill in such position.

In testimony whereof I affix my signature.

ROBERT E. MANLEY.